April 9, 1957 L. A. MOUNTFORD 2,788,192
FLUID FLOW AND PRESSURE CONTROL VALVE
Filed Jan. 23, 1951
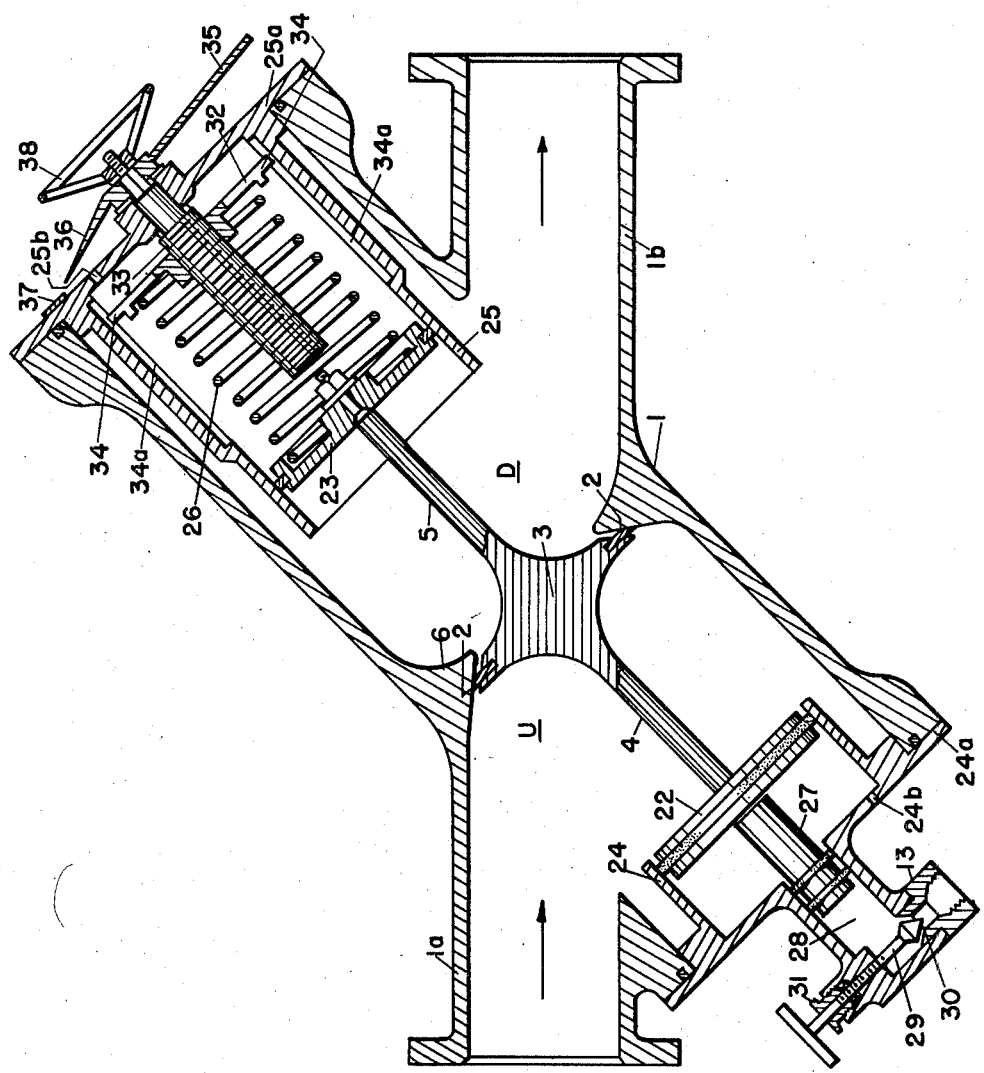
Inventor: Lawrence A. Mountford
By: Oswald H. Milmore
His Attorney

United States Patent Office 2,788,192
Patented Apr. 9, 1957

2,788,192

FLUID FLOW AND PRESSURE CONTROL VALVE

Lawrence A. Mountford, London, England, assignor to Shell Development Company, San Francisco, Calif., a corporation of Delaware Application January 23, 1951, Serial No. 207,317

Claims priority, application Great Britain April 28, 1950

6 Claims. (Cl. 251—62)

This invention relates to valves for controlling the rate of flow of fluids in bulk in accordance with variable control pressure distinct from pressures occuring within the valve structure, e. g., the pressure of the fluid at its delivery point, which pressure is hereinafter called the "delivery pressure." The valve is particularly, although not exclusively, applicable in equipment for fuelling aircraft, where it is required to deliver the fuel at a high rate, e. g., several hundred gallons per minute, while insuring that the delivery pressure does not exceed the value at which the fuel can safely be forced into the tanks in spite of variations which are liable to occur in the pumping pressure and/or the resistance to flow offered by such equipment as filters, air separators, meters and the like, and variations in the speed with which air can leave the tank.

Devices for avoiding unduly high pressures in the tank, such as might cause rupture thereof, by shutting off or throttling a control valve are known, but the known types of valve all introduce too great a flow resistance to be tolerated when high flow velocities are involved.

It is an object of the invention to improve the operation of such valves and to provide an improved valve that is capable of efficiently controlling the flow of a fluid which is to be delivered in large quantities at high velocities, in accordance with a control pressure, e. g., a delivery pressure, which must be kept within a small range of values in spite of variations in the pressure head available for pumping the fluid through the valve or in the resistance offered to its flow. Ancillary thereto, it is an object to provide a control valve of the type indicated that will operate effectively and offer only a relatively small resistance to the flow of fluid despite flow at high velocities.

A further object is to provide a flow control valve having mechanism for operating it automatically in response to a control pressure at a remote point, e. g., the controlled delivery pressure, including pressure-responsive elements with movable walls both upstream and downstream from the movable valve for balancing static thrusts on either side thereof, wherein the valve is mounted for movement in a direction that has a component parallel to the direction of flow of the fluid in the sense that an opening movement of the valve is in a direction opposite to the fluid flow, so that the valve is assisted in the closing movement by the hydrodynamic thrust of the flowing fluid, but may be readily opened in view of the absence of hydrostatic thrust when the valve is shut. Ancillary thereto, it is an object to provide a valve of the type immediately above indicated that offers a relatively low flow resistance to the fluid and avoids the need for a double bend in the conduit or casing.

In summary, the valve for controlling the rate of flow of fluids according to the invention comprises a valve casing with an inlet and an outlet, having a valve seat that faces upstream and divides the casing into upstream and downstream chambers; a reciprocable valve member adapted to coact with the valve seat movable at least partly in a direction perpendicular to the plane of the valve seat, the valve member having an upstream stem extending from its upstream face and a downstream stem extending from its downstream face; a first pressure-responsive movable wall, such as a flexible or deformable diaphragm, bellows, piston, plunger or the like, connected through the upstream stem for movement in accordance with the movement of the valve member and having a face thereof exposed to the upstream pressure of the fluid (e. g., the pressure in said upstream chamber) tending to open the valve, the effective area of said face being such as to balance the static fluid force acting on the upstream face of the valve member; a second pressure-responsive movable wall connected through the downstream stem for movement in accordance with the movement of the valve member having a face thereof exposed to the downstream pressure of the fluid (e. g., the pressure in said downstream chamber) tending to close the valve, the effective area of said face being such as to balance the static fluid force acting on the downstream face of the valve member; pressure-responsive means for urging the valve member to one position thereof, e. g., to closed position, in accordance with a variable control pressure, e. g., the delivery pressure as transmitted by a control fluid, such as a pressure chamber having an inlet for connection to a conduit through which the control fluid from a remote point can be admitted for acting directly or indirectly on the opposite face of one of said movable walls, e. g., the first wall; and means for applying a regulating or bias thrust to the valve member tending to move the latter to the opposite position thereof, e. g., to open position, such as a pressure chamber containing a gas which acts directly or indirectly on the opposite face of the other of said movable walls, e. g., the second wall, or a spring. Although the invention is not limited thereto, it is preferred to fixed the movable walls to the corresponding valve stems for movement therewith, without interposing any differential displacement element; in such case, and where the movable walls are of a kind which offer no appreciable resistance of their own to movement in the axial direction, the effective area of the exposed face of the first movable wall is made substantially equal to the effective area of the upstream face of the valve member, while the effective area of the exposed face of the second movable wall is made substantially equal to the effective area of the downstream face of the valve member. In the most convenient construction, wherein the valve member has upstream and downstream stems of equal diameters, resulting in equal effective upstream and downstream areas for the valve member, these areas and the effective areas of the exposed faces of both movable walls are all equal.

In the preferred arrangement the inlet and outlet are in the form of pipes that are disposed coaxially or substantially so, whereby the casing can be readily coupled into a pipe or between two sections of flexible hose. Further, it is preferred to incline the plane of the valve seat so that neither the said plane nor the perpendicular thereto is parallel to the direction of flow of fluid (i. e., to the common axis of the inlet and outlet pipes, in the preferred arrangement).

By providing, as stated above, that the effective areas of the valve member and of the pressure-responsive movable walls are in pressure-balancing relation, e. g., all substantially equal, the resultant static thrust of the fluid on the valve member is substantially zero, with the result that a small drop in delivery pressure is sufficient to open the valve and that rapid opening is obtained, for example, when commencing delivery. On the other hand, the fact that the plane of the valve seat is at a substantial angle to the direction of flow of the fluid insures that when the valve is open and fluid is flowing through the casing, the upstream face of the valve member is subjected to a greater hydrodynamic thrust than the downstream face, so that the closing movement of the valve under the influence of an excessive delivery pressure is accelerated, thereby rapidly cutting down the delivery pressure to a safe value. This effect is at a maximum if the plane of the valve seat is at right angles to the flow (i. e., when the axis of movement of the valve member is parallel to the flow), but for constructional reasons such an arrangement usually necessitates introducing a double bend into the pipe in order to achieve a satisfactory disposition of the valve stems and the pressure-responsive movable walls, and this introduces resistance to fluid flow. In the preferred arrangement the plane of the valve seat is at an acute angle, for example an angle between 30° and 60°, to the direction of fluid flow between the inlet and outlet of the casing, thereby allowing the valve stems and the attached diaphragms, pistons or plungers constituting the movable wall to be accommodated at the sides of the pipe, thus obviating the necessity for a bend in the casing.

The invention will be further described by reference to the accompanying drawing which shows a longitudinal sectional view of a valve suitable for use in pipes of the fueling of aircraft.

Referring to the drawing, the casing through which the fuel flows is denoted by 1 and has an inlet 1a and an outlet 1b coaxial therewith, the direction of flow being indicated by the arrows. The flow is controlled by a valve comprising a valve seat 2 which is formed on the upstream face of an internal flange 6 in the casing 1 so that the seat faces in the upstream direction. The flange divides the casing into upstream and downstream chambers U and D, respectively. A valve member 3 of circular section is arranged to seat on the valve seat 2, the plane of the latter being disposed at a substantial angle, shown as 45°, to the direction of flow. It will be understood that it would be geometrically correct to speak of the plane of the valve seat only if the contact between the valve member 3 and the seating were strictly linear. In practice, however, this contact takes place over an area, and the plane of the seating, as this term is used herein, is to be understood as meaning a cross-sectional plane of the solid figure formed by the seating area.

The valve member 3 is provided with two stems, an upstream stem 4 and a downstream stem 5. The extremities of the stems 4 and 5 respectively are fixed to pistons or plungers 22 and 23 working in cylinders 24 and 25 respectively.

These cylinders are formed on end closures 24a and 25a, respectively, and are provided with vent openings 24b and 25b, respectively, whereby the outer faces of the pistons are subjected to atmospheric pressures. The rear face of piston 23 is acted on by a compression spring 26 which provides the regulating opening thrust or bias for the valve member. In order that a spring may be used whose size is not excessive, it is normally necessary to use a spring exerting a regulating opening thrust considerably below the required delivery pressure of the fuel. The thrust due to the latter pressure is, therefore, in this embodiment reduced before acting on the piston 22, by providing a piston 27 of smaller diameter which abuts against the outer face of the piston 22. The piston 27 works in a cylindrical control pressure chamber 28 which can be connected with the source of the control pressure, such as the delivery end of the pipe 1, by way of the connection 13. In this embodiment an adjustable restriction in the connection 13 is shown as being provided by a needle valve 29 which can be screwed towards or away from the conical seating 30, a lock nut and gland 31 being provided on the stem of the valve.

The end of the spring 26 remote from the piston 23 abuts against a spider 32 which constitutes a movable abutment and is screwed on a threaded rod 33. The spider is provided with keys 34 which slide in keyways 34a formed in the cylinder 25 and prevent the spider 32 from rotating. The rod 33 has fixed to it a lever 35 provided with a pointer 36, so that on turning the lever the compression of the spring 26 can be adjusted. The position of the abutment 32 and, hence, the compression, is indicated by the pointer 36 cooperating with a scale 37. The lever 35 is provided with a locking wheel 38.

If it is desired to increase the sensitivity of control while still using a spring to produce the regulating opening thrust, the displacement of the piston 23 for a given spring displacement may be magnified by interposing a differential displacement device between the spring and the valve member.

Instead of a spring or pneumatic regulating or reference bias thrust, the opening thrust may be derived from a point in the pipe line system, for example a point upstream of the valve, in which case the valve can act as a flow control valve.

It will be observed that the arrangement of the valve seating and member at an angle of the order of 45° to the axis of the inlet and outlet of the casing 1 materially reduces the obstruction which the valve offers to the flow of liquid through the pipe. Furthermore the configuration of the pipe adjacent to the valve seating determined by the angular arrangement of the latter has the advantage that as the valve moves away from its seating the port area increases more rapidly than the displacement of the valve. This allows shorter travel of the valve for a required maximum port area and a progressively more delicate control of flow relative to valve movement as the valve nears the seating. The resistance offered by the valve may be further reduced by giving the valve member 3 a streamlined section. Such a section would modify the effect of the hydrodynamic pressure on the closing of the valve, but this modification may in some cases be advantageous, for example when high velocities at comparatively low delivery pressures are required.

I claim as my invention:

1. A valve for controlling the flow of fluids in bulk in accordance with a variable control pressure distinct from the pressure of said fluid while in the valve comprising: a chambered valve casing; a valve seat within the casing dividing the casing into upstream and downstream chambers; an inlet and an outlet for the corresponding chambers; a valve member having upstream and downstream faces mounted for movement toward and away from said valve seat and having valve stems extending respectively through said upstream and downstream chambers; first and second pressure-responsive movable walls situated on opposite sides of the valve member and connected through said valve stems for movement in accordance with the valve member, each movable wall having an inner face directed toward the valve member to counteract the static pressure of the fluid acting on the corresponding side of the valve member; a control pressure chamber situated beyond the outer side of the first movable wall having an opening for the admission of a control fluid at said distinct variable control pressure, one wall of said pressure control chamber being constituted by a third pressure-responsive movable wall having an inner face exposed to said control fluid, said inner face having an effective area smaller than the effective area of said first movable wall; means for transmitting movement from said third movable wall to move the valve member in one direction of movement of the latter; and means acting at the outer side of the second movable wall for applying a regulating bias thrust to the valve stem at the second wall urging the valve member in the opposite direction of movement.

2. A control valve according to claim 1 wherein the said third wall is parallel to the first movable wall and has an abutting part thereof in engagement with the outer side of the first wall, said abutting part constituting the said means for transmitting movement.

3. A control valve according to claim 1 wherein said valve member is situated in the upstream chamber, said first movable wall is on the upstream side of the valve seat, said means for transmitting movement is arranged to urge said valve to closed position upon a rise in the control pressure, and the effective areas of said inner faces of the first and second movable walls being substantially equal to the corresponding sides of the valve member, whereby the hydrostatic pressure on said valve member is substantially balanced.

4. A valve for controlling the flow of fluids in bulk in accordance with a variable control pressure distinct from the pressure of said fluids while within the valve comprising: a chambered valve casing; a valve seat within the casing dividing the casing into upstream and downstream chambers; an inlet and an outlet for the corresponding chambers; a valve member adapted to seat on the valve seat and having upstream and downstream faces exposed to the fluids in the corresponding chambers, an upstream stem extending from the upstream face thereof and a downstream stem extending from the downstream face thereof; a first pressure-responsive movable wall connected through the upstream stem for movement in accordance to the movement of the valve member and arranged to be exposed on the inner face thereof to the upstream pressure of said fluid so as to balance the static pressure of the fluid acting on the upstream face of the valve; a second pressure-responsive movable wall connected through the downstream stem for movement in accordance with the movement of the valve member and arranged to be exposed on the inner face thereof to the downstream pressure of said fluid so as to balance the static pressure of the fluid acting on the downstream face of the valve member; a control pressure chamber with an opening adapted to receive a control fluid at the said distinct variable control pressure, one wall of said pressure chamber being constituted by a third pressure-responsive movable wall; means interconnecting said third movable wall and one of said valve stems for urging said valve member in one direction of movement of the latter, the effective area of said third movable wall being smaller than the effective area of that one of said first two movable walls having the inner face thereof toward the said one direction; and means for applying a regulating bias thrust urging the valve member in the opposite direction of movement.

5. A valve for controlling the flow of fluids in bulk in accordance with a variable control pressure distinct from the pressure of said fluid while in the valve comprising: a chambered valve casing providing a main flow channel for said fluid and a communicating transverse passageway having an opening through the casing; a valve seat within the casing dividing the main flow channel into upstream and downstream chambers, one of which communicates with said passageway; an inlet and an outlet for the corresponding chambers; a valve member having upstream and downstream faces mounted for movement toward and away from said valve seat and having upstream and downstream valve stems; a closure for said opening of the transverse passageway including a cylindrical wall protruding into said passageway; a plunger reciprocable within said cylindrical wall and connected through a valve stem for movement in accordance with the valve member, said plunger having an inner face directed toward the valve member to counteract the static pressure of fluids on the corresponding side of the valve member; means for moving said plunger inwardly with a force determined by said distinct variable control pressure including a control pressure chamber with an opening for the admission of a control fluid at said control pressure, said control chamber being situated in spaced relation to the outside of said plunger and including a cylindrical part having a cross sectional area smaller than that of said cylindrical wall and a smaller plunger reciprocating within said cylindrical part having one face thereof exposed to the control fluid in position to transmit movement of the valve member and a pressure-responsive movable wall on the side of the valve member remote from said plunger connected through a valve stem for movement in accordance with the valve member and having an inner face directed toward the valve member to counteract the static pressure of the fluid on the corresponding side of the valve member; and means acting on the outer side of said movable wall for applying a regulating bias thrust to the valve member in a direction opposing the thrust of the control fluid.

6. A valve according to claim 5 wherein the opening for the admission of the control fluid is provided with a regulating valve.

References Cited in the file of this patent

UNITED STATES PATENTS

| 123,771 | Deck | Feb. 20, 1872 |
| 208,344 | Stephens | Sept. 24, 1878 |
| 291,066 | Maxwell | Jan. 1, 1884 |
| 705,091 | Joule | July 22, 1902 |
| 1,153,681 | Fulton | Sept. 14, 1915 |
| 1,986,429 | Dunham | Jan. 1, 1933 |
| 2,101,925 | Webb | Dec. 14, 1937 |
| 2,230,718 | Gannestad | Feb. 4, 1941 |
| 2,301,976 | Schellens | Nov. 17, 1942 |
| 2,365,650 | Shaw et al. | Dec. 19, 1942 |
| 2,509,880 | Pelton | May 30, 1950 |
| 2,573,522 | Watt | Oct. 30, 1951 |
| 2,601,578 | Witt | June 24, 1952 |
| 2,602,627 | Britton | July 8, 1952 |
| 2,643,849 | Davis | June 30, 1953 |

FOREIGN PATENTS

| 4,930 | Great Britain | of 1914 |